July 3, 1951    J. P. PEARSE    2,558,778
METHOD AND APPARATUS FOR CONTOURING SURFACES
Filed Aug. 18, 1948    11 Sheets-Sheet 2

Inventor
John P. Pearse
By Nobbe & Swope
Attorneys

Fig. 5

July 3, 1951    J. P. PEARSE    2,558,778
METHOD AND APPARATUS FOR CONTOURING SURFACES
Filed Aug. 18, 1948    11 Sheets-Sheet 5

Fig. 9

Inventor
John P. Pearse
Nobbe & Swope
Attorneys

Fig. 10
Fig. 12
Fig. 11

Inventor
John P. Pearse
By Nobbe & Swope
Attorneys

July 3, 1951 J. P. PEARSE 2,558,778
METHOD AND APPARATUS FOR CONTOURING SURFACES
Filed Aug. 18, 1948 11 Sheets-Sheet 9

July 3, 1951 J. P. PEARSE 2,558,778
METHOD AND APPARATUS FOR CONTOURING SURFACES
Filed Aug. 18, 1948 11 Sheets-Sheet 10

Inventor
John P. Pearse
By Nobbe & Swope
Attorneys

July 3, 1951  J. P. PEARSE  2,558,778
METHOD AND APPARATUS FOR CONTOURING SURFACES
Filed Aug. 18, 1948  11 Sheets-Sheet 11

Fig. 24

Inventor
John P. Pearse
Nobbe & Swope
Attorneys

Patented July 3, 1951

2,558,778

UNITED STATES PATENT OFFICE 2,558,778

METHOD AND APPARATUS FOR CONTOURING SURFACES

John P. Pearse, Swanton, Ohio, assignor to Libbey-Owens-Ford Glass Company, Toledo, Ohio, a corporation of Ohio Application August 18, 1948, Serial No. 44,905

12 Claims. (Cl. 51—142)

The present invention relates to a method and apparatus for contouring or profiling surfaces, and more particularly to the reproduction of the exact profile or contour of a so-called master or model on a work piece.

Briefly stated, the apparatus of the invention comprises a model of the exact contour to be reproduced, an abrasive tool, such as an endless belt, that travels over and in contact with the contoured surface of the model, and a support for the work, with means for moving the work support relative to the model to bring the work into operative engagement with the abrasive tool.

While not restricted to such use, the invention is especially well adapted to the reproduction of exact contours on outline molds that are to be used in the bending of glass sheets or plates.

Such outline, open-type, or ring molds are usually made up as a substantially continuous sheet metal frame, shaped to support the marginal portions of the glass sheet, after it has been bent, upon the edges of the sheet metal of the frame. Thus, the actual supporting and shaping surfaces of these molds have a very small cross section and since they must be shaped so as to produce at least a one-way bend, usually of non-uniform curvature, and often a two-directional bend, in the glass sheet, the accurate contouring of these molds presents a difficult problem; especially since the glass sheets must be accurately bent on them to very close tolerances.

Heretofore, final profiling of the supporting surfaces of the outline molds has been done by a trial and error method, involving alternately repeated hand filing of the surfaces and comparison with the model or master. Such procedure is slow, expensive and time and labor consuming, and does not lend itself to quantity production or exact duplication of contour in a large number of molds.

It is an aim of this invention to provide a method and apparatus for rapidly, economically and accurately reproducing the exact contour of a model on a work piece or a series of work pieces.

Another object is the provision for this purpose of a profiling apparatus which includes a support for a pattern or model, an abrasive belt mounted to travel over and in contact with a surface of the model on the support, and a work support, movable toward the pattern to bring the work into operative engagement with the moving belt on the pattern.

Another object is to provide, in apparatus of the above character, an adjustable support for the pattern and means for moving the work support directly toward and away from the pattern and for also swinging the work support toward and away from and into angular relation with the pattern.

Another object is the provision in such an apparatus of means for causing linear travel of the abrasive belt in one direction across and in contact with the model surface, while at the same time reciprocating the belt bodily across the model surface in another direction.

Still another object is to provide a waxed and polished contoured surface on the model, and over which the abrasive belt travels.

Other objects and advantages of the invention will become more apparent during the course of the following description, when taken in connection with the accompanying drawings.

In the drawings, wherein like numerals are employed to designate like parts throughout the same.

Figures 1, 2:
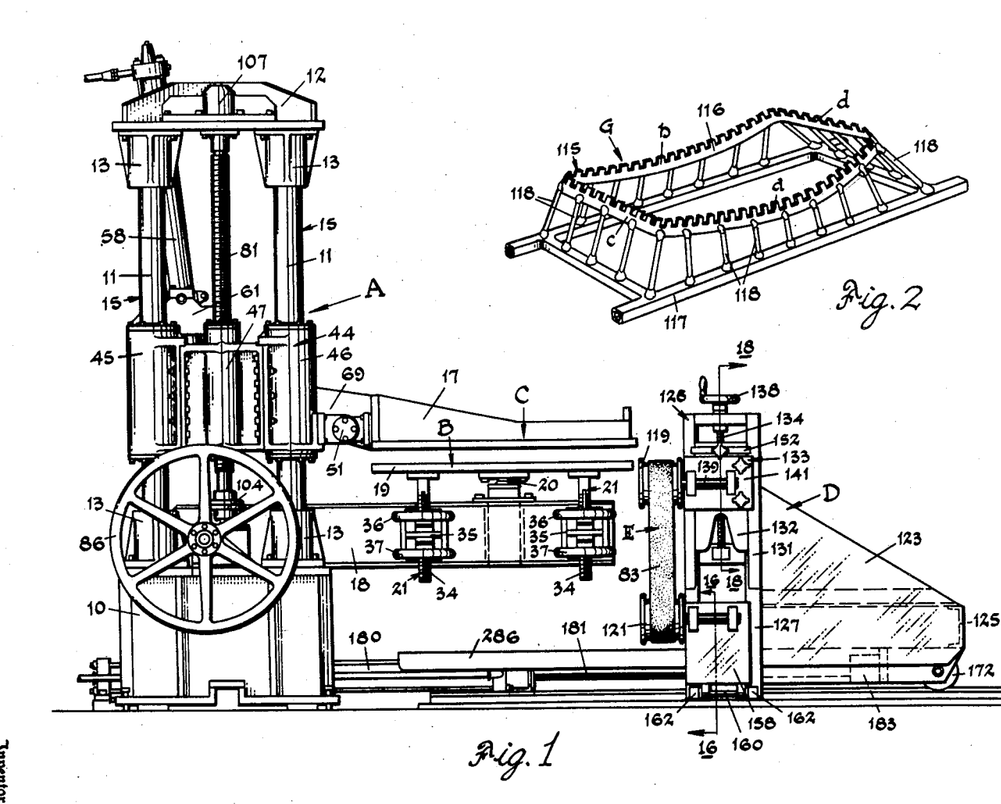
Fig. 1 is a side elevation of a contouring machine constructed in accordance with the invention.
Fig. 2 is a perspective view of one type of mold to be finished on the machine.

Referring now more particularly to the drawings, there is illustrated in Fig. 1 a contouring machine constructed in accordance with a preferred form of the invention. As illustrated, this machine comprises broadly a stationary bed, indicated by the letter A, from which are supported, in opposed relationship, a table B for supporting the model to be reproduced, and a support C for the work; and a traversing carriage, indicated by the letter D, which carries the abrasive tool in the form of an endless belt E.

Figure 3:
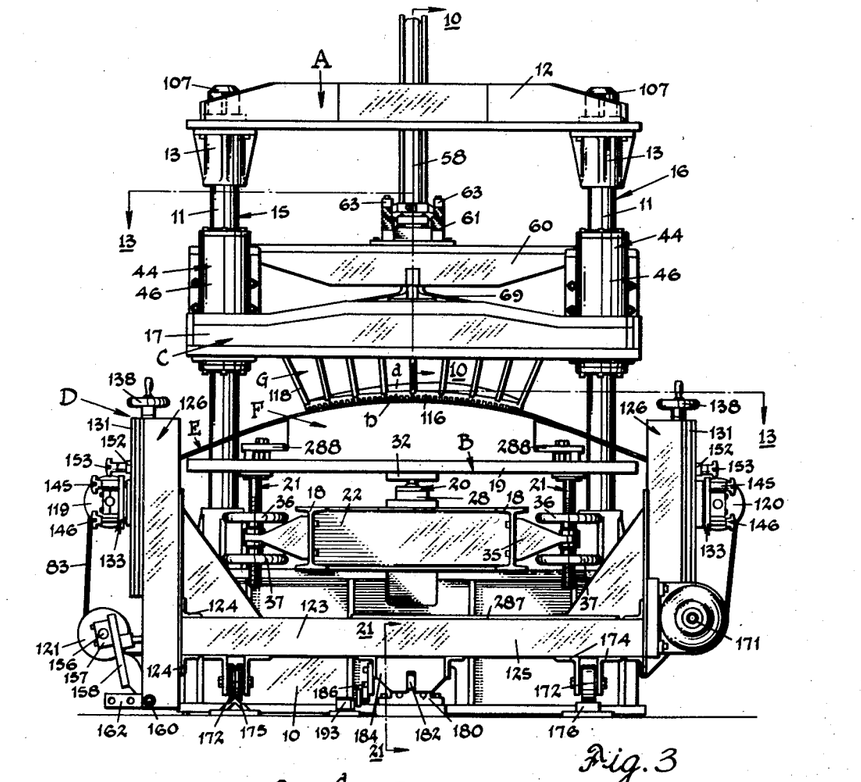
Fig. 3 is an end view of the machine, as viewed from the rear of the abrasive belt carrying carriage.
Figure 4:
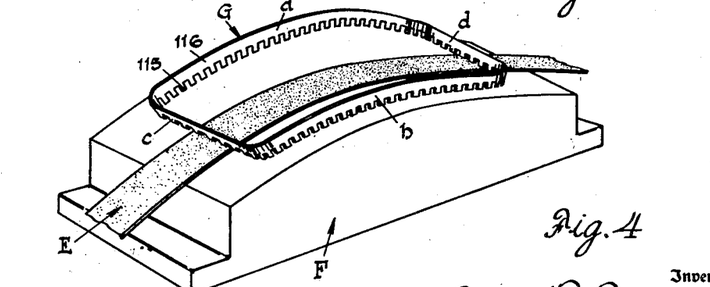
Fig. 4 is a composite view in perspective showing the working arrangement of the model, belt, and work piece.
Figure 9:
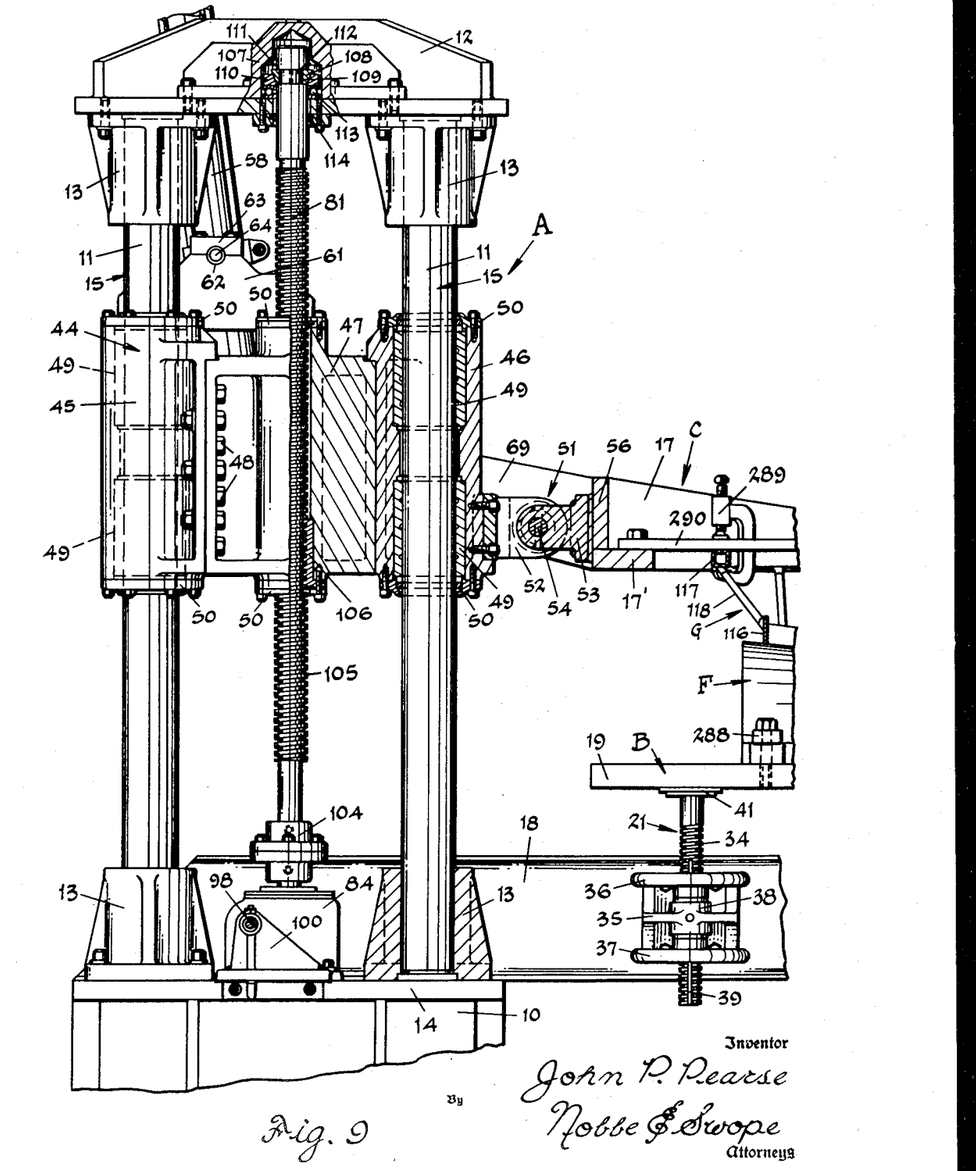
Fig. 9 is a side view of a portion of the machine, partly in section, showing the supporting and elevating members for the mold frame.

In operating the machine, the work support C is first moved away from the table B, in a manner to be more clearly hereinafter described, to permit a model F to be attached to the table B and a work piece G to be clamped to the support C. (Fig. 9.) The carriage D is then moved inwardly toward the bed A to permit the upper run of the belt E to be trained over the upper surface of the model F. (Figs. 3 and 4.)

The work support C is then lowered until the surface areas of the work that are to be profiled contact the abrasive surface of the belt. Preferably, when starting the machine operation, the belt is in motion at the time of engagement and its abrasive action on the work will be first noted at the high points of the rough surface to be ground. The belt is driven and carried by operative parts of the carriage D which, during the profiling operation, is caused to reciprocate toward and away from the bed A while the belt is in linear motion. Reciprocatory travel of the carriage is controlled to limit the extent of movement in either direction so that the traveling belt will be maintained on the surface of the model at all times. As the contacted areas of the work are gradually reduced to the desired contour, the work support is lowered until engagement of the belt and work at all points is equal, as effected by the support of the belt on the surface of the model or template as illustrated in Fig. 4.

The machine bed

The stationary bed portion A of the machine comprises a floor base 10, a plurality of vertically disposed columns 11 and a crown or cap plate 12 supported thereon. The opposite ends of the columns are located in collared brackets 13 which are bolted to the top surface or plate 14 of the base 10 and to the crown plate 12. The columns 11 are arranged at the corners of the top plate 14, and thus serve in pairs 15 and 16 as guiding surfaces for bearing members which carry the frame 17 and the necessary functional elements for producing its necessary motion in both a perpendicular and a radial direction of movement as will be described hereinafter.

Figure 6:
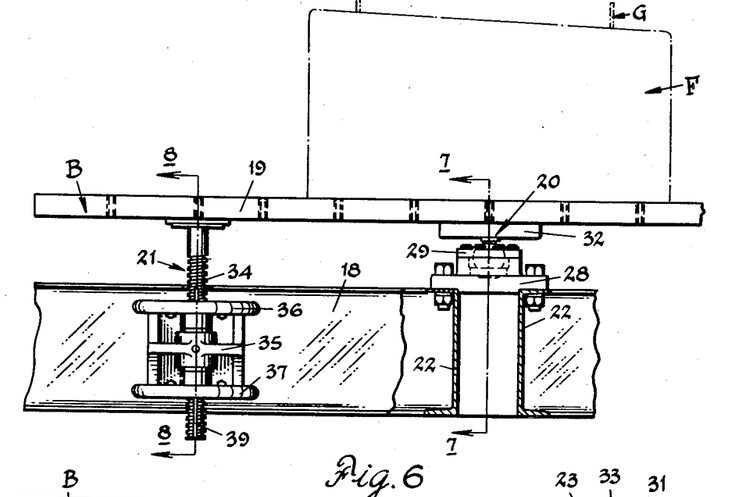
Fig. 6 is a fragmentary detail of the model supporting table and of the supports therefor.
Figures 7, 8:
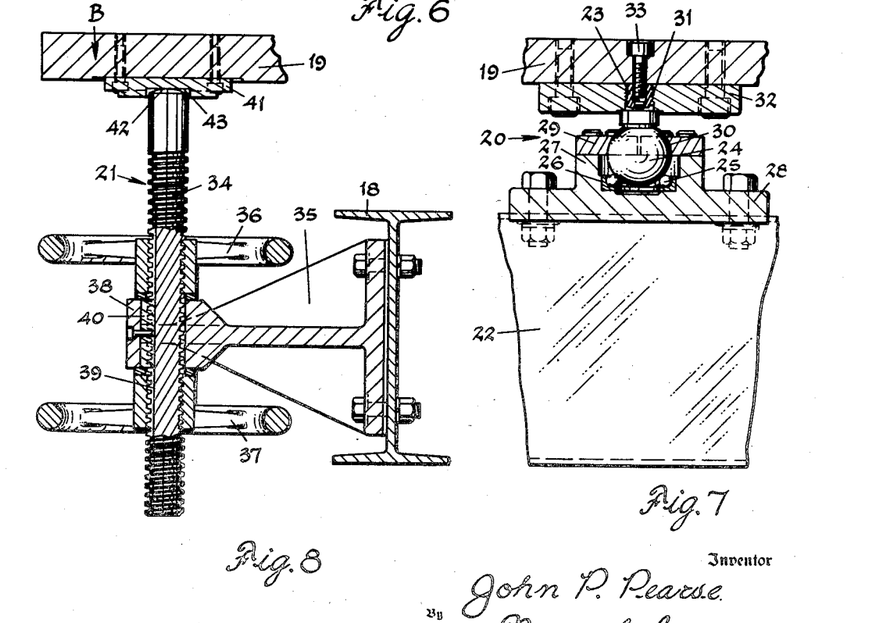
Fig. 7 is a sectional view as taken on the line 7—7 in Fig. 6 and illustrates the central, swivel support for the table.
Fig. 8 is a sectional view taken on the line 8—8 as indicated in Fig. 6 to show in detail the arrangement for supporting the table in a substantially horizontal plane or in planes which are angular with respect thereto.

Arranged between the pairs of columns 15 and 16 and extending outwardly from the top plate 14 of the base are a pair of beams 18 which are suitably bolted to the top plate. The beams 18 support the table 19 on which the plaster or wood model, such as indicated at F, Fig. 3, is secured. The table is so supported that when more efficient operation may be obtained by tilting of the table from a substantially horizontal plane, it can be swiveled to the desired angle and there retained. As shown in Fig. 6, the table 19 is centrally supported by a ball connection, indicated by the numeral 20, and, at each of its corners, by adjusting screws 21. The ball connection is carried by the beams 18 on cross channels 22 extending therebetween. The connection 20 comprises a stud 23 having a spherical end 24 located on a series of ball bearings 25 (Fig. 7). The bearings are mounted in a race 26 contained within the boss portion 27 of a bracket 28, bolted to the channels 22. The spherical end 24 is maintained on the bearings by retainer plates 29 secured to the bracket 28 and having spherically formed inner surfaces 30 which are complementary to the end 24. The outer end 31 of the stud 23 is threaded and received in a locator plate 32 bolted to the under side of the table 19. Retention of the stud is effected by means of a bolt 33 threaded into the end 31 from the upper or opposite side of the table. The table is thus supported centrally thereof in a manner to permit it to assume any desired angularity of position within the limits of movement of the spherical end 24 of the stud within the bracket 28, and is retained in such desired position by means of the adjusting screws 21. The threaded shafts 34 of the screws 21, as shown in Figs. 6 and 8, are slidably mounted in brackets 35 that are secured to the beams 18. Movement of the screw shafts with respect to the brackets 35 is produced by hand wheels 36 and 37 located on said screw shafts 34 above and below the bearing portion 38 of the brackets through which the screws extend. To assure strength of support, each screw shaft is formed with a heavy thread, commonly referred to as "Acme," and the hand wheels 36 and 37 are similarly threaded internally. The shaft of each screw 21 is also formed having a keyway 39 for receiving a key 40, located in the bearing portion 38 of the bracket, to produce endwise movement of the screw when the hand wheels are rotated along its threaded portion. When the desired projection of the screw is obtained, either or both of the hand wheels can be employed as locking members. The screws support the table 19 in its corner areas at their upper ends which are received in cup plates 41. The ends 42 of the screws are finished with arcuate or spherical surfaces which bear against the bottom of the recessed portion 43 of the plates 41. The bearing relation of the arcuate surfaces and the plates 41 permits an adequacy of angular position to be assumed by the table 19 and a freedom of movement by the screws when they move with respect to the table and cup plates to allow an alteration in its position. According to the desired direction of movement to be imparted to the screw, the hand wheel 37 below the bearing portion is released while the opposite hand wheel 36 is turned to raise or lower the screw shaft 34. Thus, the best position for a model, as indicated by the letter F, may be approximated by preliminary location of the table 19, after which a solid connection can be established with reference to the beams 18 by means of the adjusting screws 21 and the related hand wheels 36 and 37.

Figure 5:
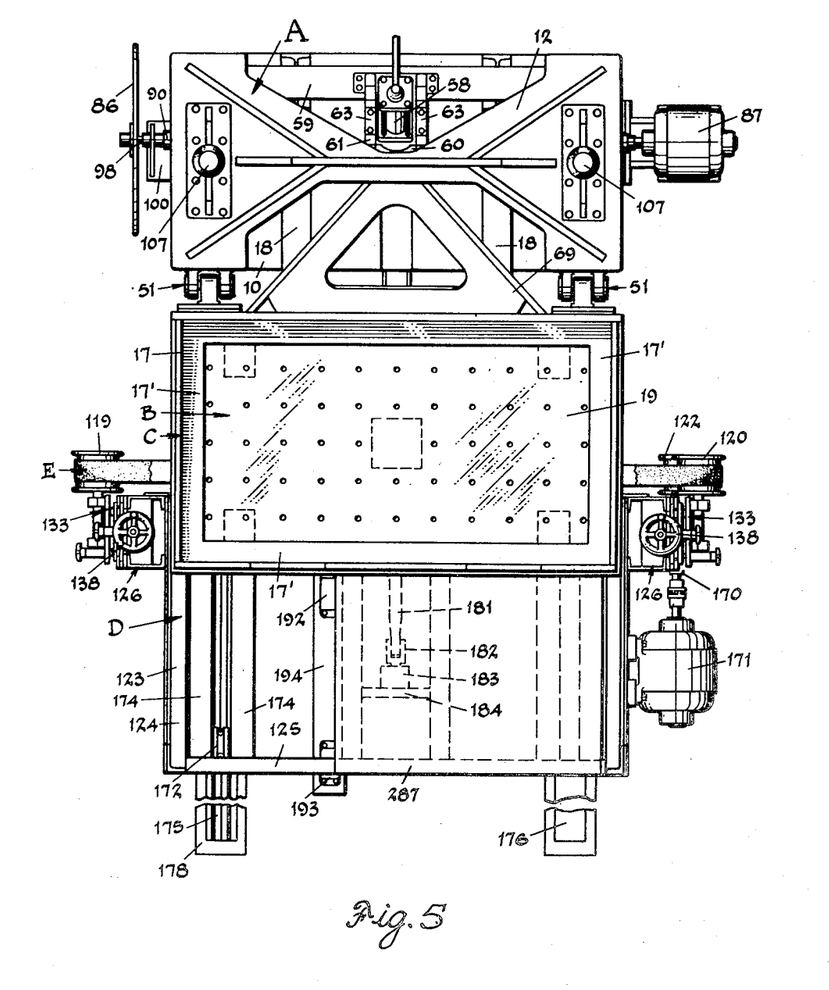
Fig. 5 is a plan view of the machine with the carriage moved into a position of operation with reference to the bed portion.

Having suitably arranged the model F on the table 19, a mold or other work piece, indicated by the latter G, is placed thereof and secured to the frame 17. The frame 17 is quadrangular in form, having an open central area that is bounded by ledges 17' to which the mold or its supporting means is secured (Fig. 5). The frame 17 and mold G can then be moved in their entirety away from the model F until the abrasive belt E is located therebetween. The frame is carried, as previously described, on the pairs of columns 15 and 16 and the manner of its movement may be effected either manually or mechanically according to the desired mode of operation.

As shown in Fig. 9, a supporting connection between the frame 17 and the pairs of columns 15 and 16 is obtained by a composite housing 44 comprising bearing housings 45 and 46 and an intermediate housing 47. The three housings are rigidly secured together by bolts 48 so as to function as an integral unit or housing 44. To assure ample bearings surface for slidably supporting the frame on the pairs of columns 15 and 16, sleeve bearings 49 are located in the ends of the housings 45 and 46, and to prevent entrance of dust and abrasive particles, the ends of each housing member are provided with suitable dust caps 50.

Figures 10, 11, 12:
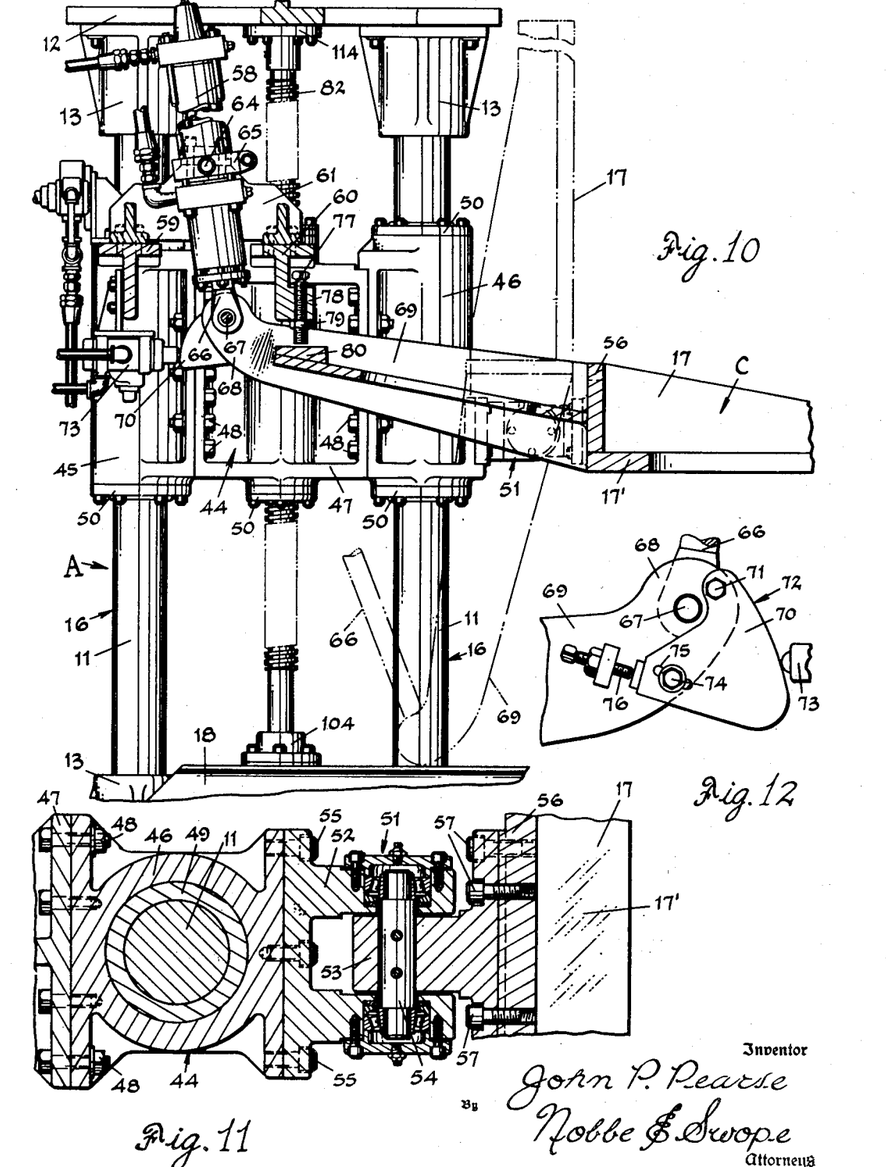
Fig. 10 is a view of a section, taken substantially on the line 10—10 indicated in Fig. 3, showing the hydraulic mechanism for revolving the mold frame from a normal horizontal plane.
Fig. 11 is a detail view of the hinge connection and support for the mold frame on the elevating member.
Fig. 12 is a detail view of an automatic control for radial movement of the mold frame.

The frame 17, having been described as movable with the housing members 44 is supported with reference thereto by trunnion or hinge connections, as indicated at 51. The hinge connections comprise a yoke 52 and pivot block 53, the two affording the hinge by means of a journaled pin 54. As shown in Fig. 11, each yoke 52 is attached by bolts 55 to a related bearing housing 46 while the block 53 of the hinge 51 is secured to the vertically disposed wall 56 of the frame 17 by bolts 57. By means of the hinge connections 51, the frame 17 is carried and adapted to move with the housing 44 and also to revolve from substantially a horizontal position to one approximately the vertical (Fig. 10). This particular feature of the contouring machine permits ready removal and replacement of the molds and also positioning of irregular mold forms in a combination with tilting of the model supporting table 19. In addition, periodic inspection of the mold shaping surface may be made during the finishing thereof.

The frame 17 is caused to revolve about the axes of the pins 54 by means of a hydraulic cylinder 58. The cylinder is carried by the housings 45 and 47 on each side of the machine. The housings 45 and 47 are interconnected by links or tie bars 59 and 60 respectively on which is centrally mounted a trunnion support bracket 61. The tie bars 59 and 60 are arranged in parallelism and extend transversely between the housings, the bar 59 being connected to the bearing housings 45 at either end while the bar 60 is connected to the housings 47 at its respective ends. The trunnion bracket 61, mounted thereon and extending between the two bars (Figs. 9 and 10), has bearing portions 62 and caps 63 for receiving the axles 64 of a mounting block 65 secured to and forming a part of the cylinder assembly. The cylinder is borne on the axles 64 and in the bearing portions of the trunnion bracket 61 to enable angular movement thereof as its associated piston rod 66 imparts a radial movement to the frame 17. The piston rod 66 and the frame are pivotally interconnected as indicated by the pin 67, the head of the rod being located between the ends 68 of a triangularly formed extension 69 from the main body portion of the frame 17.

If desired, an adjustable cam 70 can be positioned on one of the ends 68 of the extension 69 to actuate a portion of the hydraulic system for the cylinder 58 when the frame 17 has reached a substantially horizontal position for the purpose of safeguarding against injury to the cylinder should the operation continue sufficiently to overrun the working limitations or nominal stroke thereof. As shown in Fig. 12, the cam 70 is pivotally mounted on the extension 69 by means of a bolt 71. Adjustment of the relation of the cam surface 72 with reference to the actuating plunger of the valve 73 is obtained by release of a set screw 74 located in an arcuate formed slot 75 in the cam plate. The cam is locked, after adjustment, in a desired position by means of the set screw 74 and lock screw 76.

A mechanical stop may also be effected to halt rotation of the frame 17 by the bolt 77 threaded into a block 78 projecting from the tie bar 60. A lock nut 79 on the bolt 77 engages the under face of the block to arrest rotation of said bolt after it has been positioned relative to a pad 80 extending between the ends 68 of the extension 69. With this arrangement, best shown in Fig. 10, rotation of the frame 17 by the cylinder 58 will be slowed to a halt, in a manner to be hereinafter described, as the cam 70 actuates the valve 73; and further rotation of said frame beyond a substantially horizontal position will be positively arrested by engagement of the bolt 77 against the pad 80 of the extension 69.

Thus, the frame 17 may be manipulated to position the mold or work piece G or to raise and/or lower the mold with reference to the model F on the table 19. In regular operation and while finishing of the mold is being performed, the frame is carried by the housings 44 on the pairs of columns 15 and 16 and is moved up and down, therealong, by means of threaded shafts 81 and 82 which act to move the frame according to the demands of the operation and particularly to advance or "feed" the work downwardly to and against the abrasive belt 83 carried between the mold and the model. Due to the necessary ratio of reduction to be imparted to rotation of the shafts 81 and 82, a pair of gear reduction units 84 and 85 are employed. (Figs. 9 to 13.) The said reduction units are operated by means of a hand wheel 86 and a preciseness of touch or control can be imparted to the operation so that the abrading influence of the belt 83 will serve its purpose without undue creation of wear or friction. However, when it is necessary to raise the frame 17 rapidly, or to mechanically position the related surfaces of the model F and mold G, a motor 87 may be used.

Figures 13, 14:
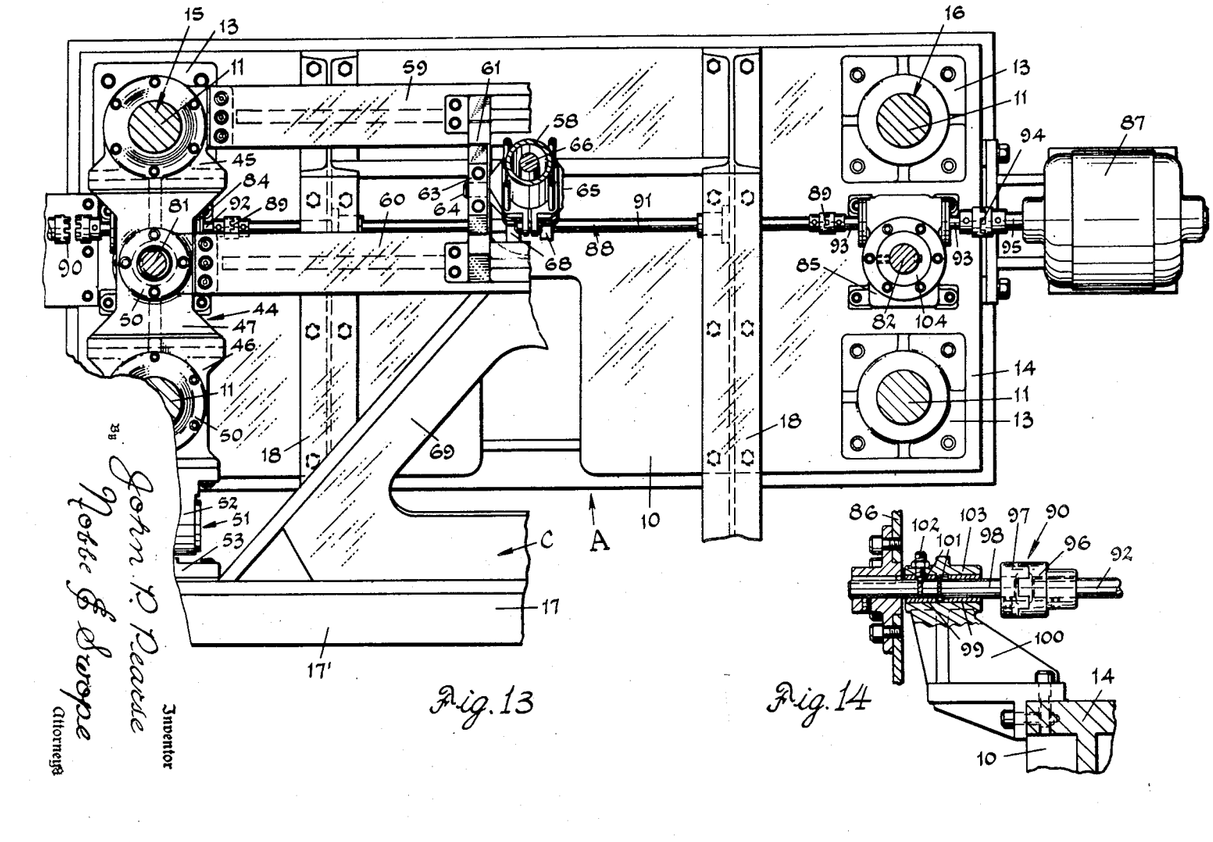
Fig. 13 is a view of a section taken substantially on the broken line 13—13 as indicated in Fig. 3.
Fig. 14 is a detail view of the manual control for the elevating members.

The general arrangement for both procedures is best seen in Figs. 13 and 14, wherein the manual means is indicated by the hand wheel 86 and the mechanical means by the motor 87 mounted on the base 10. A compound shaft, generally indicated by the numeral 88, extends between the hand wheel 86 and the motor 87 and transmits the power thereby provided to the gear reduction units 84 and 85 located midway between the pairs of columns 15 and 16. More particularly, the shaft 88 has several portions which are interconnected by couplings 89 and a clutch 90. Thus, the central portion 91 of the shaft is located between the reduction units 84 and 85 and connected to the adjoining shafts 92 and 93 respectively of said units by the couplings 89. A third coupling 94 unites the opposite end of the shaft 93 of the reduction unit 85 to the shaft 95 of the motor 87. Thus, when the motor is energized, its power will be transmitted by means of the shafts 91, 93 and 95 to both of the reduction units 84 and 85; however, when it is desirous to operate the shaft 88 by means of the hand wheel 86, the clutch 90 is engaged to impart rotation of the adjoining end of the shaft 92 of the reduction unit 84 and, through the couplings 89 and the shaft part 91, to the reduction unit 85.

As shown in Fig. 14, the separable parts 96 and 97 of the clutch 90 are so mounted that they may be generally maintained in engaged or disengaged relation. The clutch part 96 is keyed to the adjacent end of the reduction unit shaft 92 while the clutch part 97 is carried by a stub shaft 98, journaled in sleeve bearings 99 of a bracket 100 and carrying the hand wheel 86 at its opposite end. The shaft 98 has sufficient length to permit movement of the clutch part 97 with reference to the clutch part 96 according to directional pressure applied at the hand wheel. To temporarily locate the shaft 98 and the parts mounted thereon in operative or inoperative positions, a pair of grooves 101 are formed in the periphery of the shaft to cooperate with a spring actuated ball lock 102 in the hub 103 of the bracket 100.

The power, derived from either the hand wheel 86 or the motor 87, is transmitted through the gear reduction units 84 and 85 to shafts 81 and 82 which are located between the pairs of columns 15 and 16 and in substantially parallel relation therewith. The shafts 81 and 82 are connected to the driven shafts of the reduction units 84 and 85 by means of couplings 104. The central, major portion of each shaft has formed therein a square thread 105 on which is fitted a threaded sleeve 106 contained within the intermediate housing 47 of the composite housing. The frame 17 will thus be caused to move in a vertical direction upon rotation of the shafts.

The upper end of each shaft 81 and 82 is journaled in a housing 107 mounted on the crown plate 12. Contained within the housing is a thrust bearing 108 for sustaining the weight of the shaft and relieving resistance to rotation by reason of its weight. The bearing 108 comprises split thrust members 109 having conically formed outer surfaces complementary to the inner conical surface of a ring 110. The thrust members are positioned against a shoulder 111 formed by the groove 112 in the end of the shaft (in each instance, 81 and 82) so that the shaft is "hung" or carried by the members 109 and 110 which in turn are supported on a bearing 113. The bearing assembly and the shaft end is protected by a dust plate or gland 114 through which the shaft extends.

The belt carriage

The carriage D which carries the endless abrasive belt 83 is caused to move bodily with reference to the bed portion A of the machine in order that the belt, while running between the mold and model, will be progressively reciprocated back and forth across the surface of the model and thus continuously work the entirety of the mold shaping surface. The traversing action of the carriage is produced by pressures created within a hydraulic cylinder included in the pressure system of the machine and which is actuated periodically to reverse the directional pressure by electric controlling members for the related valves that are interposed between the cylinder and said pressure source. Hydraulic means is also employed to maintain the abrasive belt in adequate tension while said belt is moving across the surface of the model which surface is contoured according to the desired outline to be reproduced on the shaping surfaces of the work.

In Fig. 2, a work piece in the form of a representative mold G for the bending of flat articles, such as glass sheets or plates, is shown. The shaping surfaces 115 of the mold are produced in the edge of a thin metal strip 116 that has been suitably bent or otherwise worked to produce side portions a and b and interconnecting end portions c and d. The metal strip 116 is supported with reference to the rigid frame 117 by means of struts 118. In the arrangement as shown, the surface of the side a partakes of a curve generated by the arcs of different radius, while the similar surface of the side b is curved and follows the arc generated by one radius. The side portions c continuing from the sides a and b by the corner surfaces may be substantially straight or slightly concave and the said corner surfaces locatable in a common, level plane. Across the end portion d, however, the edge surface of the mold descends in a straight or curved line from one corner surface to the opposite surface. The resulting contour of the mold shaping surface 115 is reversed in the development of the model F and the surface formed by convex areas that are blended or faired gradually from an area approximating the side portion a of the mold to an area approximating the curvature of the side portion b.

The continuous loop of abrasive belt 83 (E) is trained about a series of pulleys that are carried on the facing side of the carriage D. The pulleys 119, 120, 121 and 122 (Fig. 3) are mounted on journaled shafts that are arranged so that the pulleys supporting the upper flight of the belt can be elevated according to the surface of the model F and other of the pulleys can move to compensate for variations of the model surfaces as the belt is drawn thereacross while being moved laterally with reference to the side of the model. More particularly, the upper flight of the belt 83 is carried by the pulleys 119 and 120, about the take-up pulley 121 and to and about the drive pulley 122.

The body or frame 123 of the carriage D is substantially rectangular in outline, angle members 124 arranged along either side being connected at their ends by channels 125 (Fig. 21) Rising at the facing corners of the frame, are corner posts 126 (Figs. 1, 3, 15 and 18), on which the pulleys 119, 120 and 121 are supported. The posts 126 are formed of opposed channels 127 having structural braces 128 and 129 extending therebetween. A plurality of rails 130 are attached to the outer legs of the channels and particularly in the upper areas, the rails in their assembly forming guideways 131 for the base 132 of a supporting member 133. The supporting member is constructed so that one portion may be moved in hinged relation to the base portion and so that both portions can be moved vertically within the guideways 131.

Figures 15, 16, 17:
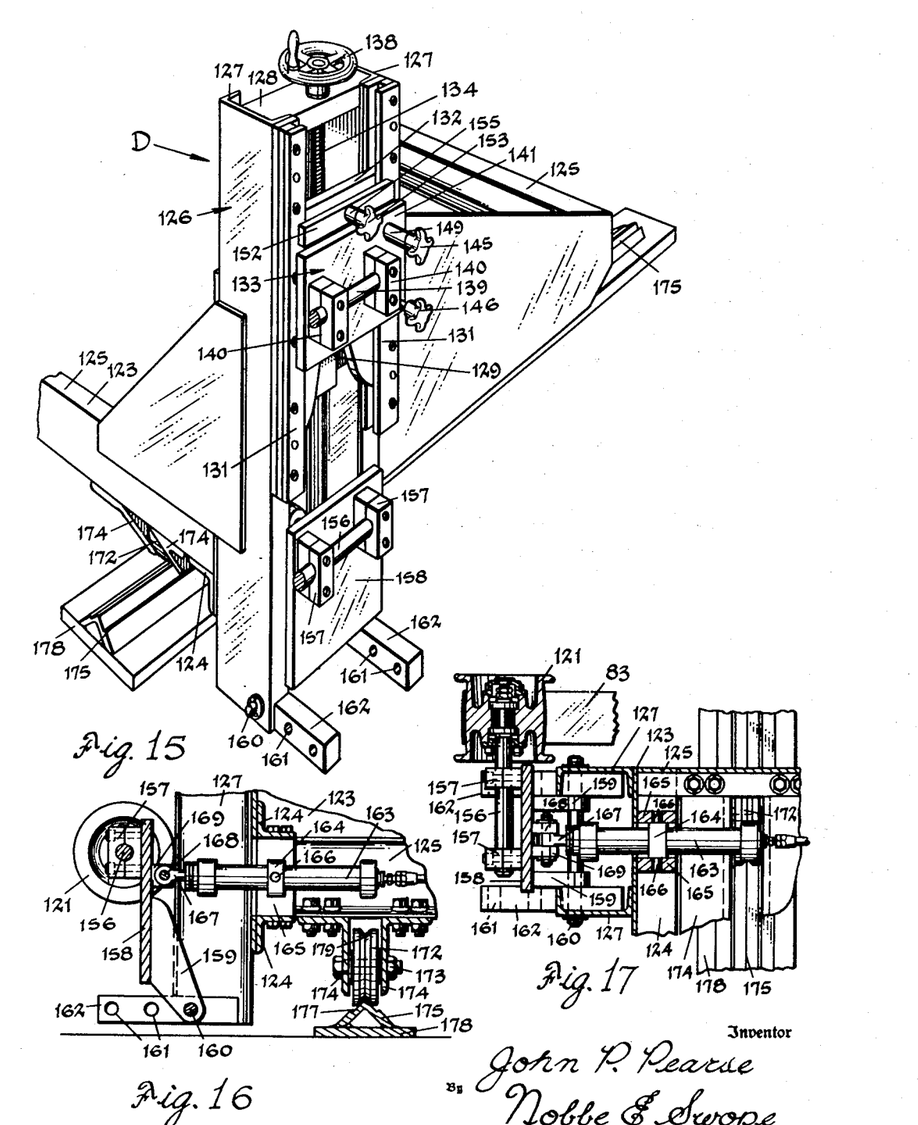
Fig. 15 is a perspective view of a corner of the carriage.
Fig. 16 is a view of a section taken substantially on the plane of the line 16—16 in Fig. 1 of the hydraulically actuated belt take-up pulley.
Fig. 17 is a sectional view of the take-up pulley as taken on the line 17—17 in Fig. 16.
Figures 18, 19, 20:
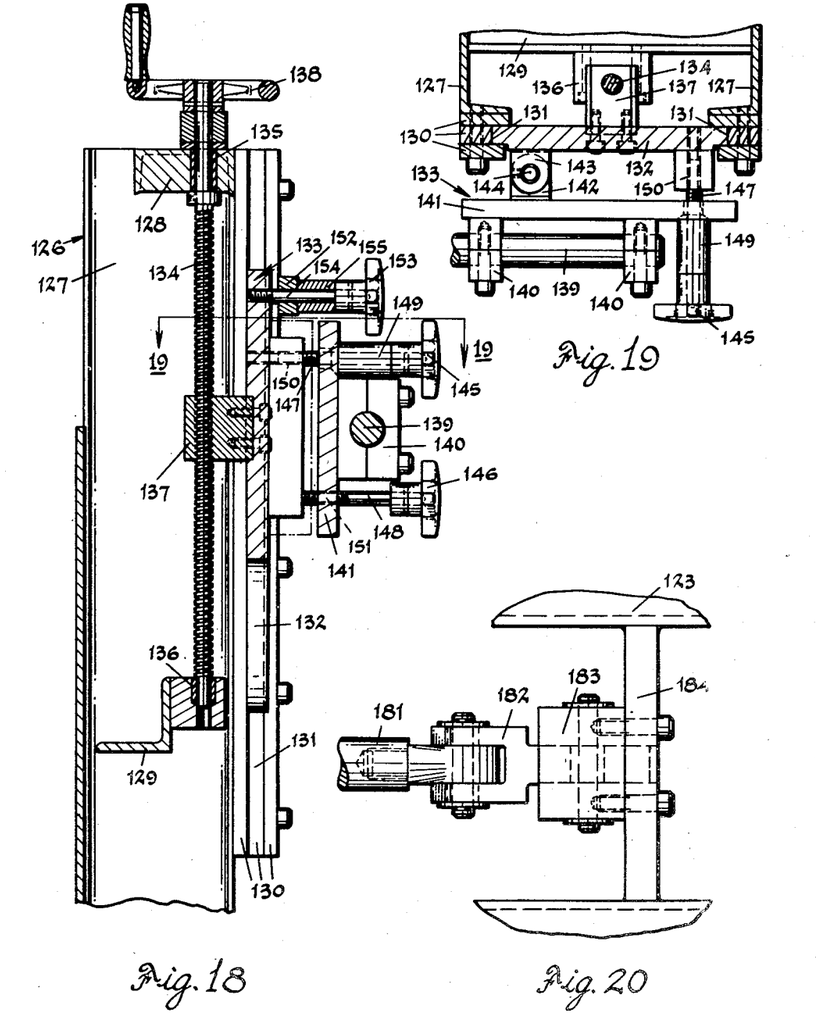
Fig. 18 is a view of a section taken on the line 18—18 as indicated in Fig. 1 and illustrates one of the belt pulley mountings and means for adjusting the same.
Fig. 19 is a view of a section taken on the line 19—19 in Fig. 18.
Fig. 20 is a fragmentary detail view of the linkage for moving the carriage.

The supporting member 133 is movable along the ways 131 by means of a threaded shaft 134 disposed between the channels 127 and carried in journals 135 and 136 in the braces 128 and 129 respectively, as shown in Figs. 15 and 18. Operative connection between the base portion 132 and the threaded shaft is effected through a block nut 137 secured to the base. The shaft 134 is rotated by means of a suitable hand crank 138 keyed to the upper end thereof to raise or lower the supporting member 133 according to the desired elevation or height of either the pulley 119 or 120 with reference to reception of the belt 83 from either end of the model F.

The pulley 119 or 120, as the case may be, is journaled on a shaft 139 carried in blocks 140 secured to a hinge plate 141 of the member 133 (Figs. 18 and 19). The hinge plate 141 has a block 142 that is mounted for pivotal movement between lugs 143 projecting from the base plate 132, the block and the lugs being drilled to receive the pintle 144. In order to swing and to secure the hinge plate 141 relative to the base plate, a pair of hand knobs 145 and 146 are provided to serve in one instance as an adjusting means and in the other as a lock. Each of the knobs have threaded shanks 147 and 148, respectively, and a bearing collar 149 is located between the handle of the knob 145 and the plate 141. The shank 147 extends through an opening in said plate and is threaded into a tapped hole 150 in the base plate 132 while the shank 148 is threaded through a tapped hole 151 in the plate 141 into abutting contact with the plate 132. The hand knobs thus cooperate to swing the plate and to lock the same in any desired position upon releasement of the shank 148 from contact with the base plate and then turning the shank 147 inwardly or outwardly in relation to the base. Since the bearing collar 149 acts to move the plate 141 in one direction when urged by the knob 145, rotation of the plate about the pintle 144 by turning of the knob 146 will bring the plate against the collar and upon continuance will actively clamp said plate. The binding relation established will prevent loosening from operating vibrations once a position of adjustment has been obtained.

The supporting shafts 139 of the pulleys 119 and 120 can thus be positioned in parallelism or at angles to each other to allow for wear or other inaccuracies which become obvious when the belt cannot properly be received but tends to run up on either of the pulleys. This would create a worn condition on either edge of the belt and eventually initiate starting breaks that might rupture an otherwise usable belt.

When the supporting members 133 in each corner of the carriage have been located in the desired elevation for the pulleys 119 and 120, said members are clamped against the ways 131 by means of bars 152 having hand knobs 153 carried thereon. The threaded shanks 154 of the knobs are located in suitably tapped holes in the base plates 132 and, by means of bearing collars 155, draw the bars 152 and the plates 132 tightly against the ways 131. Accidental or vibratory movement, or play of the threaded shaft 134 will thus be arrested and the supporting members secured in one position.

The take-up and drive pulleys 121 and 122 for the belt 83 are disposed beneath the pulleys 119 and 120 so that the belt travels in a substantially rectangular path. During the traversing reciprocation of the carriage D, the returning flight of the belt will be located beneath the table 19 and the beams 18 on which it is supported. The carriage accordingly can be moved to its extreme innermost position with respect to the base 10 or projections therefrom without danger of impedance to the belt travel over any desired surface area of the model F mounted on the table 19. The pulley 121, serving as the belt take-up element, is located beneath the pulley 119, as shown in Fig. 3. The pulley 121 is supported so that it assumes a floating relation with the belt and allows the upper flight of the belt to increase in expanse while still being retained in a generally taut condition. Conversely, when the belt lengthens in the returning flight, the pulley is urged in an opposite direction to maintain the taut condition. This take-up feature is automatically employed for preferred operation and is made possible by means of a constant pressure cylinder acting upon the support for the pulley. As shown in Figs. 16 and 17, the pulley is journaled on a shaft 156 that is carried in blocks 157 on a plate 158. The plate is pivotally supported in the lower extremity of the adjacent corner post 126 by depending arms 159 that are carried on a shaft 160. The ends of the shaft 156 are mounted in holes 161 formed in bars 162 secured to the ends of the channels 127 and having a plurality of the holes 161 arranged therein for repositioning of the shaft and plate when found necessary by reason of a longer belt or a material change in height of the model.

The pulley 121 and plate 158 are swung on the shaft 160 by a cylinder 163 pivotally mounted by a clamping ring 164 on bars 165. The clamping ring 164 has diametrically opposed trunnion projections 166 extending into journals provided in the bars. The piston rod 167 of the cylinder is hingedly connected to the plate 158 by a pin 168 extending through the end of the rod and a clip 169 secured to the plate. Outward thrust of the piston rod is maintained through the employment of suitable valves between the cylinder and the hydraulic source and, when the machine is operating, the rod is caused to urge the plate 158 to swing outwardly thereby forcing the pulley 121 against the belt and allowing the pulley to more or less float back and forth according to the expanse of belt in the returning or lower flight. As variations on the contour of the model produce a temporary need for a greater length of belt in the upper or working position, the plate will be caused to force the piston rod inwardly of the cylinder but as the belt traverses a differing area of the model F and the working portion of the belt shortens up, the cylinder pressure will advance the rod causing the plate 158 and pulley 121 to compensate for the developing slack.

Figure 24:
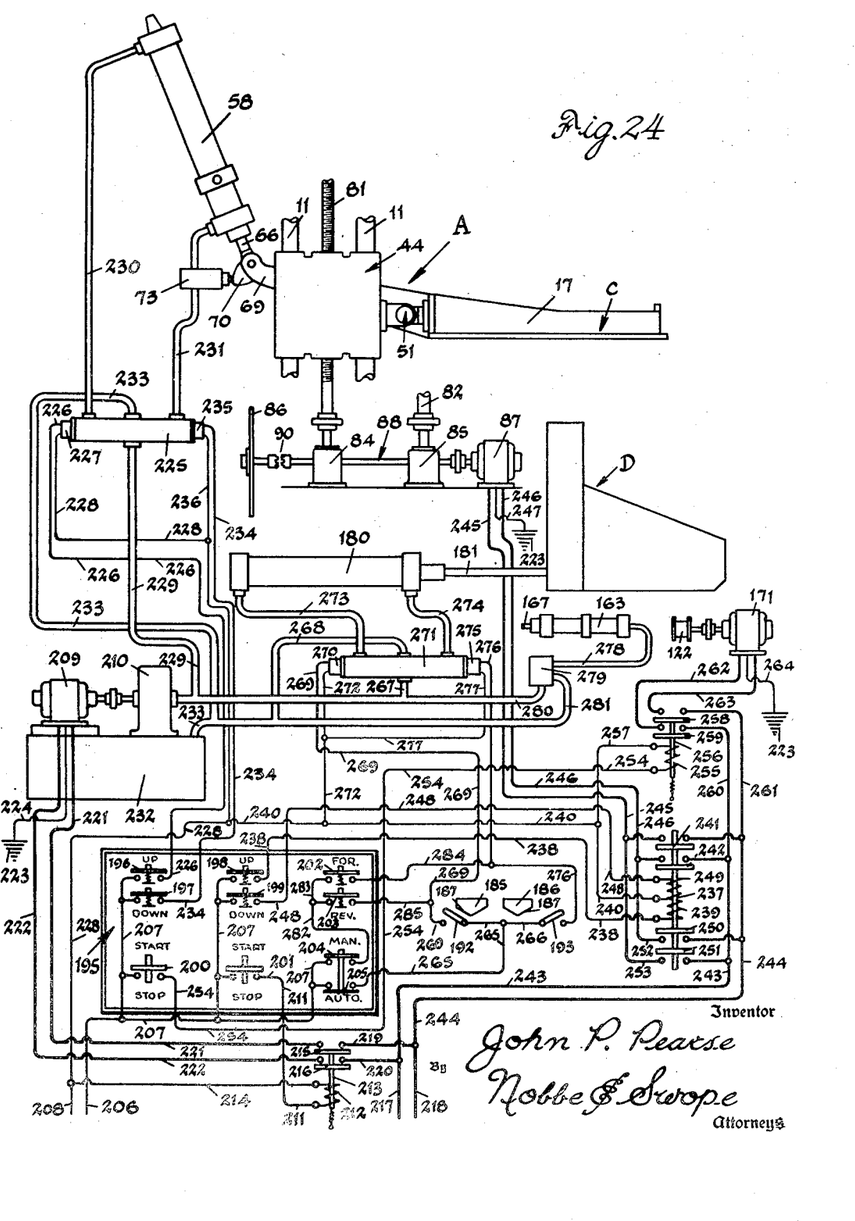
Fig. 24 is a diagrammatic view of the hydraulic and electric systems employed for operating and controlling the contouring machine.

The pulley 122, which operates the belt 83, is located beneath the pulley 120. The pulley is mounted on a journaled shaft 170 that is coupled to the shaft of a motor 171. The motor is supported on the side of the carriage frame 123. The circuit for the motor 171 is completed by suitable switches located conventionally in a panel at the operator's station, as seen in Fig. 24, and explained more in detail hereinafter.

It has been found in actual practice that use of the pulleys 119 and 120 can be dispensed with in the finishing of long molds and where the model covers substantially all of the area of the table between the sides. The belt 83, in such instances, is trained about the take-up pulley 121 and the drive pulley 122 only and the upper or working flight of the belt is supported solely on the surface of the model.

The carriage B is provided in each of its corner areas with wheels 172 that are carried on stub shafts 173. The wheels are located between pairs of angles 174 constituting a portion of the frame 123 and extending between the channels 125. The wheels travel on rails 175 and 176. Preferably, at least one rail and one pair of wheels are adapted to cooperate as a guide track and as shown in Fig. 16, the rail 175 is provided in the form of an angle bar 177 that is attached to a bed plate 178 to afford a V-shaped rail, while the related wheels have complementary annular grooves 179 formed in their peripheries. The carriage D will thus be caused to travel in a straight path without creeping deviations which eventually would disrupt the mobile relation of the carriage and the bed portion of the machine.

Figure 21:
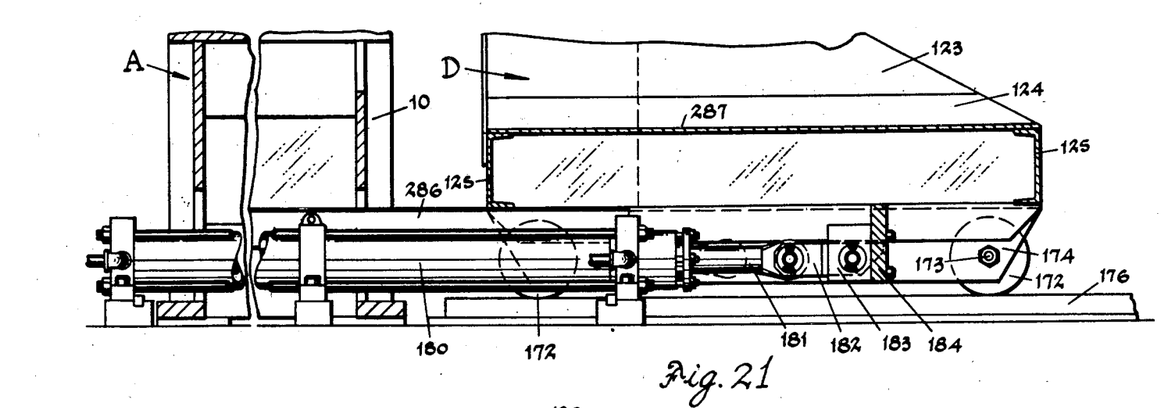
Fig. 21 is a view of a section, taken on the line 21—21 as indicated in Fig. 3, of the cylinder arrangement for moving the carriage.

The reciprocating travel of the carriage along the rails 175 and 176 is produced by a hydraulic cylinder 180 which is controlled to alternately supply pressure at each end within a length of piston stroke equal to the desired lateral movement of the belt 83 across the model F. The cylinder is located and extends through suitably formed apertures in the walls of the base 10 of the bed portion A (Fig. 21). Preferably, the normal stroke of said cylinder is sufficient to bring the carriage well under the table 19 or outwardly therefrom an adequate distance for movement about the associated parts. The piston rod 181 is attached by a link 182 to a block 183 carried on a cross web 184 of the carriage frame 123. The alternate supplying of hydraulic pressure to each end of the cylinder is automatically controlled by a pair of cams 185 and 186 that are mounted in spaced relation on the frame 123 (Fig. 22).

Figure 22:
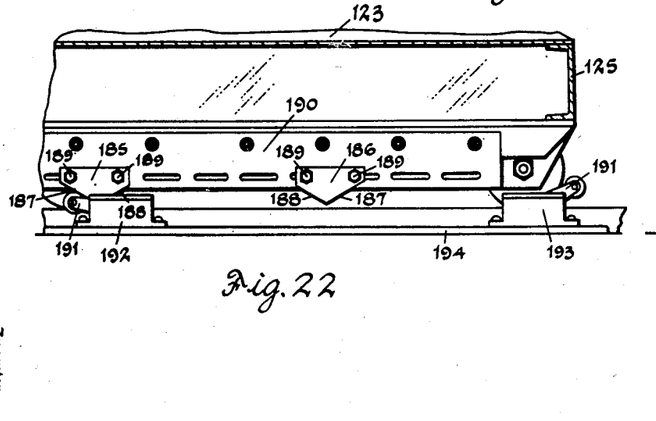
Fig. 22 is a detail view of the switch controls for limiting movement of the carriage.
Figure 23:
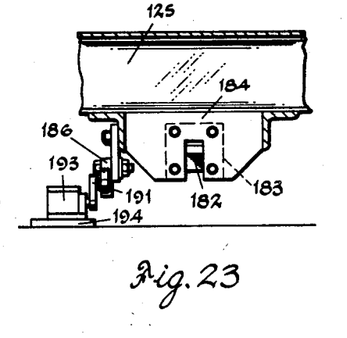
Fig. 23 is an end view of the control elements shown in Fig. 22.

As shown in Figs. 22 and 23, the cams 185 and 186 have angulaly formed surfaces 187 and 188 formed on the lower edge of their body portions that are attached by bolts 189 to a slotted plate 190 secured to a part of the carriage frame. The cams are disposed on the slotted plate 190 so as to actuate, by means of their respective cam surface 187, the arms 191 of a pair of limit switches 192 and 193 that are secured to a floor plate 194. To limit the lateral working area of the belt as determined by the width of the mold or to prevent the belt from running off either side of the model, the effective controlling distance between the actuating surfaces 187 of the cams 185 and 186 is made equal to such desired widths and, by means of the switches 192 and 193, control valves for the cylinder 180 are operated to periodically reverse the flow of pressure and thus automatically bring about reciprocation of the carriage D. The limit switches 192 and 193 are included in the general system and arrangement of a control panel and may be by-passed, when necessary, so that the carriage can be controlled manually.

A simplified hydraulic and electric combination of system is diagrammatically shown in Fig. 24. Many conventional and commonly utilized valves and switch mechanisms which may be provided if desired have been dispensed with for reasons of clarity. The panel, generally indicated at 195, is usually mounted on the bed portion A in convenient position for the operator and is provided with adequate control devices for initiating or halting the operation of any or all of the functioning parts. The switches 196 and 197, as indicated, control the operation of the cylinder 58 for rotation of the frame 17 upward or downward about the hinges 51; the switches 198 and 199, the elevation or descent of the frame by means of the motor 87 and through the threaded shafts 81 and 82; the switch 200 controls the belt motor 171, while the switch 201 controls the circuit for a pump motor. The switches 202, 203, 204 and 205 provide for the operation of the carriage D; the switches 204 and 205 determining whether the control thereof shall be manual or automatic—if manual, then the circuits are established through the switches 202 and 203, otherwise, the switch 205 places the carriage under the control of the limit switches 192 and 193.

Following the above-described circuits more in detail, the switches collectively are connected to one side of 110-V service outlet 206 by the line 207 while the return to the service outlet is indicated at 208. The switch 201, which controls the operation of a motor, indicated at 209, of the pump 210 for supplying fluid under pressure to the hydraulic system, completes a circuit when depressed from the service line 207 to a line 211 and coil 212 of a relay switch 213. The return side of the coil is connected by a line 214 to the service return 208. The relay switch 213 closes a pair of contacts 215 and 216 to establish a circuit from the service sources 217 and 218 by lines 219 and 220 to the motor leads 221 and 222, and thence from the motor 209 to the service return 223 by a line 224. During operation of the pump 210, fluid pressure is directed to a plurality of valves which actuate the pistons of the cylinders 58, 163 and 180, according to their described purpose or sequence of operation.

Thus, when the frame 17 is to be swung in an upward or downward direction of rotation, the switch 196 or 197 will be employed to create circuits for operation of the solenoid actuated valve 225. The service line 207 is connected through the switch 196, when closed, to a line 226 extending to the end 227 of the valve 225; the circuit being completed to the service return 208 by the line 228. The valve 225 is connected to the pump 210 by a pipe 229 and directs the hydraulic pressure to the upper end of the cylinder 58 by a pipe 230. As the piston rod 66 is moved outwardly, the lower end of the cylinder is exhausted by a pipe 231, through the valve and to the reservoir tank 232 by a pipe 233.

During the interval of switch closure, the piston rod 66 will carry the extension 69 of the frame downward with a resultant upwardly swinging movement of the frame 17 about the hinges 51 (broken lines in Fig. 10). Likewise, when the switch 196 is open and the switch 197 is actuated, a circuit from the service line 207 through the switch and by the line 234 to the opposite end 235 of the solenoid valve 225 and lines 236 and 228 to the return 208, will cause reversal of the valve mechanism so as to supply hydraulic pressure through the pipes 229 and 231 to the lower end of the cylinder 58. The piston rod 66 will accordingly be moved inwardly and the contained fluid exhausted by the pipe 230, the valve and pipe 233 to the tank 232. As the piston rod raises the extension 69 of the frame, the body portion thereof will descend to a substantially horizontal position (full lines in Figs. 1 and 10) as when placing a mold G relative to the model F.

Should the pressure be inadvertently maintained in the pipe 231 after the frame 17 has been returned to a horizontal position, the cam 70 will have operated the valve 73 to create a block in the pressure line between the valve 225 and the cylinder 58 thus assuring a gradual deceleration of movement of the piston rod 66. The parallel control afforded by the stop bolt 77 which engages the pad 80 of the frame extension 69 (Fig. 10) positively stops the frame at its horizontal position following operation of the valve 73.

The switches 198 and 199 control the service lines to the motor 87, which drives the threaded shafts 81 and 82 through the shaft 88 and reduction units 84 and 85 to raise and lower the frame 17 vertically, through the double contacts of a relay switch 237. The switch 198, when depressed, completes a circuit from the service line 207, the line 238 to the coil 239 of the relay 237 and line 240 to the return branch 228, closing the double contacts 241 and 242 of the relay to establish supply circuits from the service sources 217 and 218 by the lines 243 and 244 and the lines 245 and 246 to the motor 87 to lift the frame 17 by the housing assemblies 44, the return from the motor being by the line 247 to the service return 223. Release of the switch 198 deenergizes the control circuits of the motor 87 and the frame 17 remains stationary unless the switch 198 is again actuated to further elevate the frame or the switch 199 is depressed to cause the descent thereof.

The switch 199 completes a circuit from the service supply 206 and line 207, through line 248 to the opposed coil 249 of the relay switch 237 and line 240 to the return branch 228. Energization of the coil 249 reverses the motor circuits from the lines 245 and 246 at the double contacts 250 and 251 so that the branch lines 252 and 253 change the polarity of the motor at the lines 245 and 246 and accordingly the motor 87 operates to lower the frame 17. Preferably, during the above-described selection of motor control, the hand wheel 86 is disengaged from the shaft 88 at the clutch 90. It has also been found preferable to employ conventional switches which produce exceedingly short periods of operation commonly termed "inching." The frame 17 can, by the use of such forms of switches, be moved with precision to advance or feed the mold toward the belt 83 or back it away therefrom.

When it is found that the mold G and model F are most advantageously located with respect to each other, the switches 200 and 204 or 205 are manipulated to initiate operation of the belt motor 171 and the manual or automatic control for movement of the carriage D. Closure of the switch 200 completes a circuit from the service source 207 and line 207 by a line 254 to the coil 255 of a relay switch 256 and by the lines 257 and 240 to the return branch 228. The relay 256, when actuated, closes the contacts 258 and 259 which in turn complete circuits from the service lines 243 and 244 by the lines 260 and 261 to the motor 171 through the lines 262 and 263; thence by the line 264 to the service return 223.

The carriage D, which is caused to travel according to the pressure supply to the cylinder 180, is controlled by the switches 204 and 205. When it is desirable to operatively and automatically advance or retract the carriage, the switch 205 is actuated to open the switch 204 thereby placing the operation under control of the limit switches 192 and 193. The switch 204, when open, by-passes the control of the manual selection switches 202 and 203, while the switch 205 being closed completes a circuit from the service supply 206 and line 207 by the line 265 and branch line 266 to the switches 192 and 193. Actuation of said limit switches by the cams 185 and 186 causes sequential reversal of the mechanism of a solenoid valve 271. The valve is connected to the pump 210 by the pipe 267 from the pipe 229 and to the tank 232 by the return pipes 268 and 233.

When the carriage is traveling toward the bed portion A of the machine, its extent of motion is controlled by the switch 192 when depressed or otherwise acted upon by the surface 187 of the cam 185. Upon closure of the said switch, a circuit is completed from the branch supply line 265 and by the line 269 to the end 270 of the valve 271 and a line 272 to the branch return 240. The pressure thereupon is directed from the supply branch 229 through the valve to the rear end of the cylinder 180 by the pipe 273, while the opposite end is connected by the pipe 274 and through the valve to the return pipe 233. The carriage will now reverse its travel and move away from the bed portion A until the surface 187 of the cam 186 engages the switch 193 causing its closure. The switch 193, through the branch supply lines 265 and 266 energizes the solenoid at the side 275 of the valve 271 through the line 276 and line 277 to the branch return lines 272 and 240. Pump pressure will now be connected from the supply pipe 229 through said valve to the pipe 274 communicating with the forward end of the cylinder 180 while the opposite end thereof is connected by the pipe 273 of the valve to the tank by the pipes 268 and 233. The carriage will accordingly travel toward the bed portion A until the switch 192 is again actuated by the cam 185.

During the reversing or reciprocating travel of the carriage, the belt 83, which is operated by the motor 171, is moved laterally across the model and against progressively new areas of the mold. As the belt is thus moving over the constantly changing contours of the model and by reason of said contoured areas requires temporary increase in beltage, the pulley 121 is swung back and forth to continually compensate for the variance. The plate 158, upon which the pulley shaft 156 is mounted, is urged by the cylinder 163 to maintain the pulley outward to increase the expanse of belt in its returning flight. The cylinder is connected by the pipe 278 and through a self-acting valve 279 and pipe 280 to the pump 210. The valve 279 is conventionally constructed to by-pass, while under a back pressure, the pump pressure into a branch return 281; thus, when the expanse of the upper flight of the belt is increased and the piston rod 167 is forced inwardly, a release is temporarily effected within the valve. Subsequently and as the condition disappears, the valve closes its return side and the contained pressure fluid acts to thrust the piston rod 167 outwardly so that the pulley 121 can take-up or compensate for the variance in belt length in each of the flight portions of its continuity.

Upon completion of the mold finishing operation or when it is desirable to manually control the carriage motion when the belt is not operating, the switch 205 is opened upon closure of the switch 204. The service supply line 207 is then completed to the switches 202 and 203 through lines 282 and 283. The switch 202 is connected by the line 284 to the line 276 from the switch 193 so that upon its actuation (switch 202) a circuit is closed from the line 207 to the lines 284 and 276 to the related end 272 of the valve 271 and by the line 277 to the branch return 240. Similarly, when the switch 203 is depressed, a circuit is created by the lines 282 and 285 to the line 269 from the switch 192 and to the related side 270 of the said valve and by lines 272 and 240 to the return.

Operation of the several functioning parts of the machine can thus be handled at the panel 195 by the operator and in several instances while the finishing of a mold is being consummated.

It has been found preferable to attach to the frame 123 of the carriage a cover 286 which extends forwardly over the piston rod 181 thereby shielding its surface from the descending refuse created by the abrasion operation. Also, the carriage D may be provided with a plate 287 carried on the channels 125 so that access to the mold or model can be had while the carriage is in operation. When inspection of the mold is therefore required, an operator can mount the platform and temporarily ride with the carriage until he has become satisfied with performance of the belt between the model F and mold G.

The complete sequence of finishing a mold

With the carriage D spaced from the bed portion A and the relative elements in idleness (Fig. 1), a model F is placed upon the table 19 and adequately secured thereon by clamps 288 as shown in Fig. 3. To position it advantageously, the table 19 is moved by means of the adjusting screws 21 which engage said table in its corner areas. A mold G having rough finished shaping surfaces is then attached to the frame 17. The position of said frame may be best judged by the approximated position of the model and adjustment made either by operation of the cylinder 58 or the motor 87 through the control switches 196 to 199 inclusive. The outer frame 117 of the mold is clamped to the frame 17 by clamps 289 as best seen in Fig. 9 of the drawings. The clamps 289 are illustratory only of mold retaining means and will vary in size and form according to the dimension of the frame 117 of the mold G. As shown in the figure, the clamps 289 secure the frame 117 against bars 290 carried on the ledges 17' of the frame.

Having properly located the model and mold, the surface of the model is rubbed with a suitable wax to reduce friction and resultant heat created by the sanding belt. Bayberry wax, dissolved in gasoline and painted on the mold, may be used for this purpose; and it has also been found desirable to apply soap, or soap in water glass, to the back of the belt.

The carriage D may then be moved to position the belt 83 on the model F by actuation of the switch 202 and its operation of the valve 271 controlling the pressure in the cylinder 180. Before starting operation of the belt motor 171, the frame 17 is lowered by the operation of the motor 87 through the actuation of the switch 199 until the shaping surfaces rest upon the belt. Preferably, then the switch 198 is closed to slightly raise the frame and mold and to avoid preliminary roughening and drag. With the motor 171 started and the controls for the cylinders 180 established for the limit switches 192 and 193 through the switch 205 so that the belt is moving laterally across the model, the hand wheel 86 is engaged with the shaft 88 through the clutch 90. Gradual turning of the wheel 86 will progressively advance the mold G to the traveling belt 83 until the shaping surface 115 will have been finished to the contour of the model F, by the action of the abrasive belt during its combined linear and reciprocatory movement.

The belt may be used dry, or it may be coated with oil before use. Also, a wet grinding may be obtained by spraying water on the belt during grinding.

It is to be understood that the form of the invention herewith shown and described is to be taken as a preferred embodiment of the same, but that various changes in the shape, size and arrangement of parts may be resorted to without departing from the spirit of the invention or the scope of the subjected claims.

I claim:

1. In a contouring machine, a model having a curved surface contour which it is desired to reproduce, means for immovably supporting said model in a fixed position thereon, means for supporting a work piece in operative relation to said model, an abrasive element movable over and in contact with the contoured surface of the model, means for moving said element over said model in two different directions simultaneously, and means for creating relative movement between the work supporting means and the model supporting means toward and away from one another to bring the work into working engagement with said element as it moves over said model.

2. A contouring machine comprising, a support, a model on said support and having a contour on a surface thereof which it is desired to reproduce, an abrasive belt having a run thereof trained over the contoured surface of said model, a support for a work piece, means for causing linear travel of said belt over the surface of the model and for simultaneously moving said belt bodily over the model, and means for causing relative movement between the work support and said model support toward and away from one another to bring the work into operative engagement with the run of the belt traveling over said model.

3. A contouring machine comprising, a support, a model on said support and having a contour on a surface thereof which it is desired to reproduce, a belt having an abrasive surface and a relatively smooth surface, a coating of soap on the smooth surface of the belt, said belt being trained over the contoured surface of the model with said smooth and soaped surface in contact therewith, a support for a work piece, means for causing linear travel of said belt over the surface of the model and for simultaneously moving said belt bodily over said model, and means for causing relative movement between the work support and said model support to bring the work piece into operative engagement with the abrasive surface of the moving belt.

4. A contouring machine comprising, a support for a model, a model having a contour on a surface thereof which it is desired to reproduce, means for immovably mounting said model in fixed position on said support, an abrasive belt trained over the contoured surface of said model, a work support movable toward and away from said model support, means for causing linear travel of said belt over the surface of the model and for simultaneously moving said belt bodily over said model, means for moving said work support toward and away from said model support in a direction perpendicular thereto, and means operable in the same plane for swinging said work support toward and away from said model support.

5. A contouring machine comprising, a support for a model mounted adjacent its center on a universal support, means for adjusting said model support on said universal support, a model mounted on said model support and having a contour on a surface thereof which it is desired to reproduce, an abrasive belt trained over the contoured surface of said model, a work support normally in alignment with and movable toward and away from said model support, means for causing linear movement of said belt over the surface of the model and for moving said belt bodily over said model, and means for moving said work support to bring the work carried thereby into operative engagement with the portion of said belt traveling over said model.

6. A contouring machine comprising, a support for a model, a model mounted on said support and having a contour on a surface thereof which it is desired to reproduce, a work support mounted above said model support for movement toward and away from said model, a carriage movable into and out of surrounding relation with said model support, an endless abrasive belt carried on said carriage and adapted to be trained over the contoured surface of said model when said carriage is in surrounding relation to said model support, means for driving said belt over the surface of the model, and means for moving the work support to bring the work carried thereby into operative engagement with said belt as it travels over the model.

7. A contouring machine comprising, a support for a model, a model mounted on said support and having a contour on a surface thereof which it is desired to reproduce, a work support mounted above said model support for movement toward and away from said model, a reciprocating carriage movable into surrounding relation with said model support, an endless abrasive belt carried on said carriage and adapted to be trained over the contoured surface of said model when said carriage is in surrounding relation to said model support, means for driving said belt over the surface of the model, means for reciprocating said carriage, means for limiting the reciprocatory movement of the carriage to retain the belt on said model surface, and means for moving the work support to bring the work carried thereby into operative engagement with the moving belt.

8. A contouring machine comprising, a stationary bed, a beam extending outwardly from said bed, a model supporting table arranged above said beam, a universal support at the center of said model table for supporting the same on said beam, adjusting screws mounted on said beam and engaging said table at opposite corners thereof for adjusting the angularity of the table, tracks running outwardly from said bed parallel with said beam, a carriage mounted on said tracks, an abrasive belt carried by said carriage and adapted to be trained over the surface of said model, a work support also extending outwardly from said bed and mounted for vertical and swinging movement thereon, means for driving said belt, means for reciprocating said carriage on said tracks, means for raising and lowering said work support to bring the work carried thereby into operative engagement with the driven belt, and fluid operated means for swinging said work support relative to said model supporting table.

9. The method of reproducing surface contours from a model onto a work surface comprising bringing the work surface to be contoured into contact with an abrasive surface moving in two directions simultaneously over and in contact with the surface of the model that it is desired to reproduce on the work.

10. The method of reproducing surface contours onto a work surface comprising moving an abrasive belt in two directions between a surface of the contour it is desired to reproduce and a work surface to be contoured.

11. The method of reproducing surface contours from a model onto a work surface comprising bringing the work surface to be contoured into contact with an abrasive surface moving in one direction continuously and alternately in one of two other directions over and in contact with the surface of the model that it is desired to reproduce on the work.

12. In a machine for contouring the bending surface of a skeleton type bending mold, a model having a curved surface contour which it is desired to reproduce on the bending surface of said mold, a horizontally arranged support for said model, means for immovably securing the model in fixed position on said support, means for supporting a skeleton type bending mold horizontally above and in vertical alignment with said model support, an abrasive belt trained over the contoured surface of said model, means for continuously moving said belt in two directions simultaneously over said surface, and means for moving said mold support vertically to press said moving belt between the contoured surface of said model and the bending surface of the mold on said mold support.

JOHN P. PEARSE.

REFERENCES CITED

The following references are of record in the file of this patent:

UNITED STATES PATENTS

| Number | Name | Date |
|---|---|---|
| 552,066 | Leach | Dec. 24, 1895 |
| 973,059 | Marten et al. | Oct. 18, 1910 |
| 1,060,565 | Hall | Apr. 29, 1913 |
| 1,082,670 | Wysong | Dec. 30, 1913 |
| 1,434,334 | Freeman | Oct. 31, 1922 |
| 1,628,531 | Calson | May 10, 1927 |
| 1,701,814 | Maddox | Feb. 12, 1929 |
| 1,956,985 | Edwards | May 1, 1934 |
| 2,334,960 | Roth et al. | Nov. 23, 1943 |
| 2,367,107 | Emmons | Jan. 9, 1945 |
| 2,376,847 | Glike | May 22, 1945 |
| 2,445,391 | Elmes et al. | July 20, 1948 |
| 2,453,972 | Clave et al. | Nov. 16, 1948 |

FOREIGN PATENTS

| Number | Country | Date |
|---|---|---|
| 248,918 | Italy | June 22, 1926 |